(12) United States Patent
Musselman

(10) Patent No.: US 6,906,281 B2
(45) Date of Patent: Jun. 14, 2005

(54) METHOD FOR LASER WELDING OF METAL

(75) Inventor: Gary H. Musselman, Lancaster, PA (US)

(73) Assignee: Dana Corporation, Toledo, OH (US)

(*) Notice: Subject to any disclaimer, the term of this patent is extended or adjusted under 35 U.S.C. 154(b) by 50 days.

(21) Appl. No.: 10/376,624

(22) Filed: Mar. 3, 2003

(65) Prior Publication Data

US 2004/0173587 A1 Sep. 9, 2004

(51) Int. Cl.$^7$ .............................................. B23K 26/00
(52) U.S. Cl. ........................... 219/121.64; 219/137 R; 219/137 WM
(58) Field of Search ................. 219/121.63, 121.64, 219/137 R, 137 WM

(56) References Cited

U.S. PATENT DOCUMENTS

| | | | | |
|---|---|---|---|---|
| 4,634,832 A | * | 1/1987 | Martyr | 219/121.63 |
| 4,649,426 A | | 3/1987 | Bolstad | 348/90 |
| 4,684,779 A | * | 8/1987 | Berlinger et al. | 219/121.64 |
| 4,737,612 A | | 4/1988 | Bruck et al. | 219/121.64 |
| 4,803,334 A | | 2/1989 | Burke et al. | 219/121.64 |
| 4,835,357 A | | 5/1989 | Schalk | 219/121.64 |
| 5,371,337 A | | 12/1994 | Campbell et al. | 219/121.63 |
| 5,408,065 A | | 4/1995 | Campbell et al. | 219/121.6 |
| 5,603,853 A | | 2/1997 | Mombo-Caristan | 219/121.64 |
| 5,831,239 A | | 11/1998 | Matubara et al. | 219/121.64 |
| 6,191,379 B1 | * | 2/2001 | Offer et al. | 219/75 |
| 6,303,891 B1 | | 10/2001 | Gault | 219/74 |
| 2003/0136768 A1 | * | 7/2003 | Sonoda et al. | |
| 2004/0000539 A1 | * | 1/2004 | Takikawa et al. | |

FOREIGN PATENT DOCUMENTS

| | | | | |
|---|---|---|---|---|
| JP | 63-30193 | * | 2/1988 | B23K/26/00 |
| JP | 6-254689 | * | 9/1994 | B23K/26/00 |
| JP | 2002 103069 | | 4/2002 | B23K/26/00 |
| JP | 2002 144063 | | 5/2002 | B23K/26/00 |
| JP | 2002-144064 | * | 5/2002 | B23K/26/00 |
| JP | 2002 160082 | | 6/2002 | B23K/26/00 |

OTHER PUBLICATIONS

Graf T. et al.: "Laser–Hybrid Welding Drives VW Improvements" Welding Journal, American Welding Society, Miami USA. vol. 82, No. 1, Jan. 2003, pp. 42–48, XP001177395, ISSN: 0043–2296.

* cited by examiner

Primary Examiner—Kevin P. Kerns
(74) Attorney, Agent, or Firm—Liniak, Berenato & White

(57) ABSTRACT

A method of welding at least two metal sheets protected by a zinc coating that has a low vaporizing temperature. The metal sheets are placed on top of each other and a head of a welding machine is passed over the sheets. The head of the welding machine is configured such that a laser is positioned in front of a GMAW welding or MIG brazing device. The laser cuts a channel into the metal sheets in order to allow the protective zinc coating to vaporize and escape. The GMAW welder or MIG brazing device then follows the laser and deposits a material that fills the channel to weld the two pieces together.

8 Claims, 2 Drawing Sheets

METHOD FOR LASER WELDING OF METAL

BACKGROUND OF THE INVENTION

1. Field of the Invention

The present invention relates to a method for a hybrid laser welding multiple sheets of steel together. More particularly, the present invention relates to a method for performing a laser beam welding operation for joining steel stampings to hydroformed parts using a single penetrating lap joint design.

2. Description of Related Art

Conventionally, laser beam machines are known to be employed, not only for cutting flat or otherwise drawn sheet metal along given cutting lines, but also for spot or seam welding sheets together. The sheets may be either steel stampings or hydroformed parts which may or may not be coated with a protective layer, such as zinc, on the surface.

During laser welding, the energy from the laser beam penetrates through the first piece into the second piece of steel, heating portions of the two pieces to a sufficiently high temperature so that they melt and coalesce together to form a lap joint. However, when sheets are coated with a protective layer, such as zinc, on the abutting surfaces of the first and second pieces, the protective layer vaporizes into a gaseous state and develops pressure between the upper and lower portions of the weld joint. The vapor pressure expands out through the molten base metal created by the laser beam and results in weld porosity, excessive spatter and poor weld surface conditions such as undercut, underfill and voids. These conditions can cause failures in the weld at a later point in time.

If two thus protected metal sheets using a material such as zinc or a similar material are welded together using the same technique employed for welding bare sheet, the resulting welds invariably prove uneven and riddled with craters, faults which, involve high-cost follow-up machining for their removal.

According to general practice, two steel sheets for laser welding are held together contacting each other as tightly as possible along the entire weld area by means of grips, so as to ensure, among other things, maximum thermal conduction between the sheets. The sheets are then subjected to a laser beam, which welds the sheets together by smelting the metal in the weld area swept by the beam.

While the aforementioned method has proved particularly effective for welding bare sheet steel with and without the addition of filler metal, which attaches to the area proximate with the joint between the two sheets of steel to build a weld seam, it is not particularly effective for sheets of material that are coated with some protective layers as mentioned above.

This method proves inadequate when welding together metal sheets protected against external agents by using a layer of coating of low-vaporizing-temperature materials. The term "low-vaporizing-temperature material" is intended to mean material, such as zinc, that has a melting and vaporizing temperature considerably below that of iron or ferrous.

Additional methods are known to eliminate these imperfections during the welding process when welding two sheets of metal, the metal being of the type having associated gases tending to be trapped and expand in the weld zone, e.g., vaporized zinc, during welding due to heat from the laser. One method adds to the standard laser beam a surrounding stream of pressurized shield gas effective to create a pressure at the surface of the weld zone sufficient to force the molten metal of the two sheets together and force the expanded associated gases out of the weld zone in a direction away from the laser beam, whereby a non-porous weld may be created.

Another method for welding galvanized material discloses a low vapor pressure mild steel core and a high vapor pressure rich zinc coating including the steps of arranging components of such galvanized material in juxtaposed relationship at a lapped joint and applying a high density laser energy beam along the lapped joint as a weave pattern. The weave pattern has a width great enough to bridge the lapped joint and a weave pattern frequency, which forms a predetermined weld pool between the components. Here, the lapped joint and weave pattern combine to define a vapor pressure relief path so that the weld pool will not be disrupted during the application of the high density laser energy beam to the galvanized components.

In another method, two sheet metal parts are placed in proximity of each other, wherein one sheet is placed on top of the other piece so that a top surface of the first sheet faces away from the other sheet metal. A laser beam is applied to the top surface facing away surface of the second sheet and a feed wire comprising a supplemental metal and a reactive agent is provided at the intersection of the laser beam and the surface to which the laser beam is applied. The reactive agent reacts with the zinc in the protective layer steel to prevent at least a portion of the zinc from vaporizing and the supplemental wire acts as filler for a resulting weld to the extent necessary. A relative movement is affected between the sheet metal parts and the laser beam to provide a quality laser weld of the two sheet metal parts.

It is also known to laser weld steel sheets that have a thin corrosion protective coating of zinc with a method where the steel sheets are positioned vertically. A laser beam, which is positioned normal to the sheets, is then applied to the sheets to melt the material of the sheets and create a weld. During the welding, the sheets and laser beam are moved vertically relative to each other such that laser heating of the material creates a cavity. Thus, liquid or molten material flows vertically downwardly by gravity to elongate the cavity and thereby facilitate the escape of zinc vapors from the cavity.

Similarly, it is known to use a pulsed laser beam when laser welding steel sheets that have a thin corrosion protective coating of zinc to melt the material of the sheets and create a weld. During welding, the laser beam is pulsed ON and OFF and the sheets and pulsed laser beam are moved vertically relative to each other such that laser heating of the material creates a cavity. Here again, liquid or molten material flows vertically downwardly by gravity to elongate the cavity and thereby facilitate the escape of zinc vapors from the cavity.

It is also known to alter the shape of the sheets, the location of the clamp, and the placement of the weld in order to allow external communication between a protective layer and the sheets in the vicinity of the weld area.

Thus, the prior art fails to provide adequate disclosure of the relationship of the sheet shape and the weld location relative to the physical characteristics of the sheets.

In view of the above-mentioned drawbacks, there is a need for a specific geometrical relationship between two zinc-coated sheets of materials, the laser weld location and the geometric shape of the sheets.

SUMMARY OF THE INVENTION

The present invention is directed to a method for performing a laser beam welding operation to bond two pieces of metal together. The method includes the steps of: providing at least a first metal material and a second metal material in an overlapping relationship; providing a head that further includes a laser device and at least one of a GMAW welding and MIG brazing device in a spaced apart relationship; moving the head relative to the first metal material and the second metal material such that the laser device emits a laser beam towards the first metal material; cutting with the laser completely through the first metal material and at least partially into the second metal material to form a channel in the second metal material; and filling the channel by using at least one of the GMAW welding and MIG brazing devices to weld together the metal materials fill the channel.

The present invention is directed to a method that provides a method for joining pieces of metallic material. The pieces of metallic material may or may not be coated with a protective layer such as a zinc coating.

These and other benefits will be apparent with reference to the following detailed description and associated drawings, which exemplify the underlying principles of the instant invention.

DETAILED DESCRIPTION OF THE PRESENT INVENTION

Figure 1:
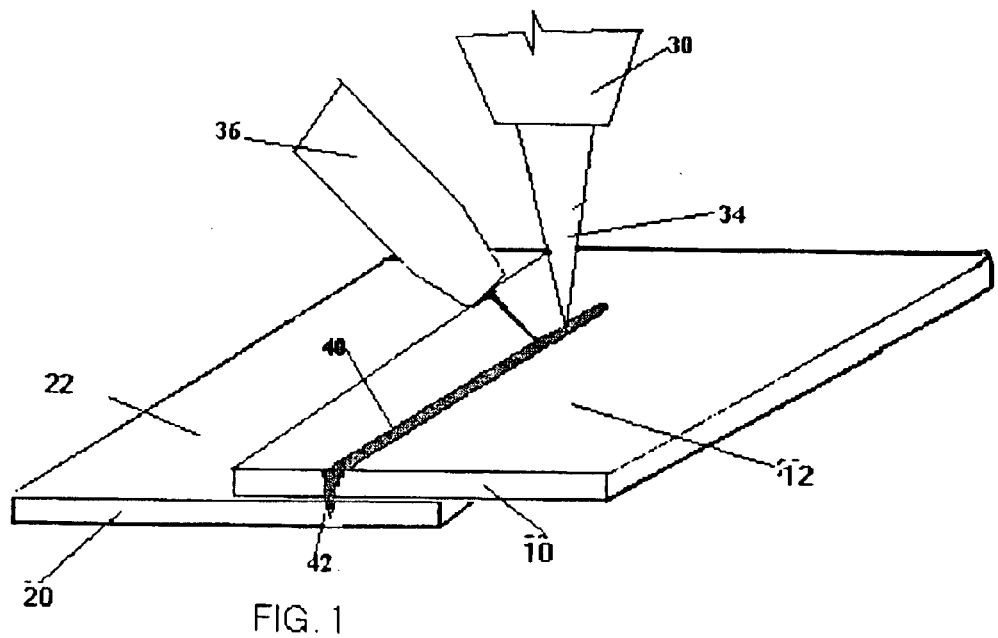
FIG. 1 is a perspective view showing the two metal sheets as they are bonded together.

As shown in FIG. 1., a first sheet of metal 10 is to be joined with a second sheet of metal 20. The first sheet of metal 10 is arranged on top of the second sheet of metal 20. Both the first sheet of metal 10 and the second sheet of metal 20 include a protective layer 12, 22 made of a low-vaporizing-temperature material. One example of such a material is zinc.

While FIG. 1 indicates that metal sheet 10 and metal sheet 20 are separate sheets, it should be appreciated that for the purposes of this invention, the two metal sheets may also consist of a single sheet bent or wrapped to resemble some form of a U-shape.

Furthermore, the attached drawings illustrate that a single protective layer 12, 22 is provided on the top surface of both metal sheets 10, 20. Typical thickness for a protective layer of zinc placed onto a metal sheet ranges from zero to approximately 7.5 microns.

Figure 2:
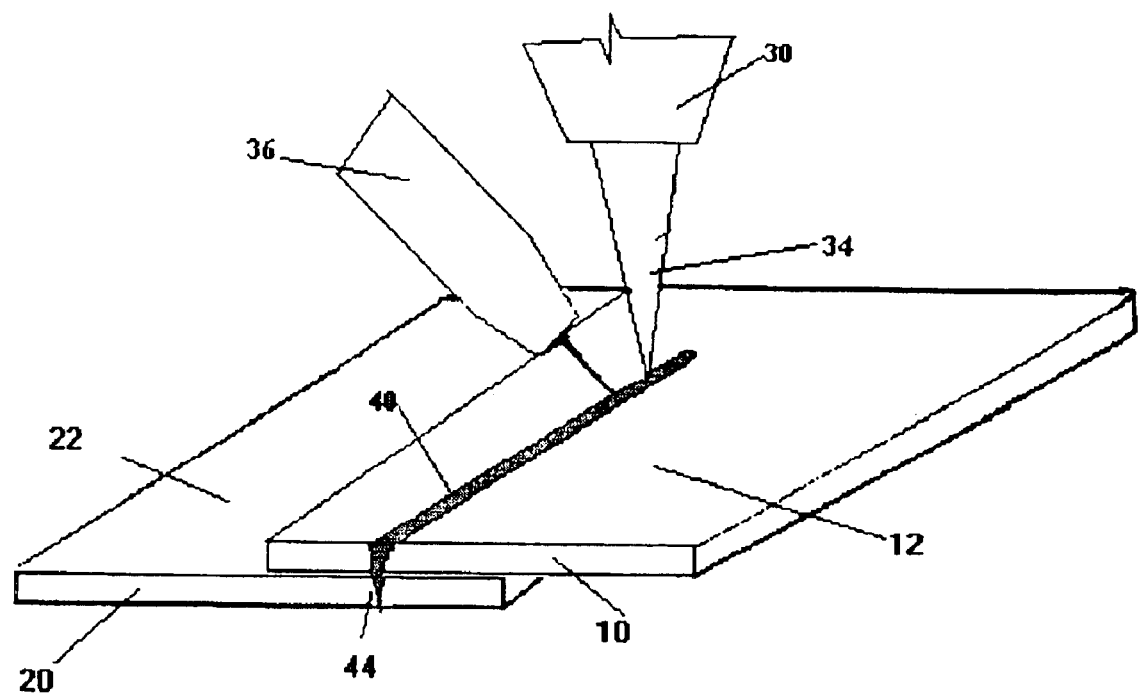
FIG. 2 is a perspective view of an alternate embodiment of the present invention showing the trough or channel cut completely through the two metal sheets.

The particular location of the protective layers 12 and 22 as indicated in FIGS. 1 and 2 by no means limits the invention; as is usually the case in actual practice, metal sheets 10 and 20 are each provided with two opposed protective layers (not shown). Finally, whereas, in all the attached drawings, a single protective layer 22 of the second metal sheet 20, is located between sheets 10 and 20 as depicted in FIGS. 1 and 2, the ensuing description would obviously in no way be affected if the protective layers 12, 22 of both sheets 10 and 20 were located facing each other between the metal sheets. Similarly, the protective layers 12 and 22 can be located on both a top and a bottom surface of each of the sheets, not depicted in the figures.

As seen in FIG. 1, the first metal sheet 10 is positioned on top of the second sheet of metal 20. The overlapping portion of the first metal sheet 10 is generally the same shape and/or contour as the corresponding portion of the second sheet of metal 20 over which the first sheet 10 is placed.

It is conceivable that the shape or contour of the first and second sheets of metal do not align with one another. Such a situation does not limit the applicability of the present invention. A gap between the first and second sheets of metal that is relatively slight would not affect the weld achieved through this method. However, the smaller the gap between the two metal sheets, the better formed is the resultant joint weld.

Once the first sheet of metal 10 and the second sheet of metal 20 have been properly positioned, they are held in place and positioned relative to the head 30 on the welding machine. The head 30 of the welding machine is arranged facing the free surface of the first metal sheet 10. While FIG. 1 shows the head 30 oriented to the free face of the first metal sheet 10, it is also possible to orient the head 30 from the underside toward the bottom free surface of second metal sheet 20

The head 30 of the welding machine is a hybrid version that includes both a laser 34 device coupled with a gas metal arc welder (hereinafter referred to as "GMAW") 36, in order to join the two metal sheets 10 and 20 in the vicinity of a weld area 40. The laser 34 is oriented in the head such that the laser 34 precedes the GMAW 36 when making passes to join the two metal sheets 10 and 20.

In the preferred embodiment, the head 30 of the welding machine is positioned facing the top surface of the first metal sheet 10 as described above. The laser 34 first contacts the weld area 40 as the head 30 of the welding machine passes over the first and second sheets 10 and 20.

The laser 34 emits an energy beam sufficient to penetrate through the entire thickness of the first sheet 10 and at least partially into the thickness of the second sheet 20. As the first sheet 10 of metal is penetrated by the beam emitted from the laser 34, the two pieces of sheet metal 10 and 20 are heated in the vicinity of the weld area 40. The heat and/or energy from the laser results in an increase in temperature in the vicinity of the weld area 40 and results with the vaporization of the protective layers 12 and 22 proximate the weld area 40. The vaporized gases from the protective layers 12 and 22 then dissipate into the environment. The end result once the laser 34 has passed is a channel or trough 42.

Once the laser 34 has excavated the channel or trough 42 through the first metal sheet 10 and at least partially into the second metal sheet 20, the GMAW 36 fills the channel or trough 42 with a metal inert gas (MIG) brazing material from the GMAW 36 or a conventional welding device mounted on the head 30 so as to follow directly behind the laser 34.

In an alternate embodiment as best seen in FIG. 2, the first and second sheets of metal 10 and 20 are held firmly in place in order to prevent movement. As the head 30 of the welding machine passes over the metal sheets 10 and 20, the laser 34 cuts a gap 44 completely through both the first and the second sheets of metal 10 and 20. The GMAW 36 then follows in trace of the laser 34 and fills the gap 44 will with a MIG brazing material in order to form a secure weld in the weld area 42.

From the foregoing description, one skilled in the art can easily ascertain the essential characteristics of this invention, and without departing form the spirit and scope thereof, can make various changes and modifications of the invention to adapt it to various usages and conditions. For example, the coating may be of another material other than zinc.

I claim:

1. A method for performing a laser beam welding operation to molecularly bond two pieces of metal together including the steps of:
    providing at least a first metal material and a second metal material in an overlapping relationship;
    providing a head that further comprises a laser device and at least one of a GMAW welding and MIG brazing device in a spaced apart relationship;
    moving said head relative to said first metal material and said second metal material;
    cutting completely through said first metal material and at least partially into said second metal material by using said laser device to form a channel in said first and second metal materials through which vaporized gases produced during the step of cutting escape into an external environment; and
    filling said channel with one of a welding material and a brazing material by using said at least one of a GMAW welding and MIG brazing device to weld said first metal material and said second metal material together,
    wherein said step of filling said channel is delayed from said step of cutting due to said spaced apart relationship of said laser device and said at least one of a GMAW welding and MIG brazing device so as to allow the vaporized eases produced during the step of cutting to escape through said channel into said external environment.

2. The method according to claim 1, further comprising the step of providing a protective layer on at least one of said first metal material and said second metal material.

3. The method according to claim 2, wherein said protective layer is a zinc based material.

4. The method according to claim 2, further comprising the step of vaporizing said protective layer as said laser device cuts said first metal material and said second metal material.

5. The method according to claim 4, wherein said vaporized protective layer dissipates into external environment through said channel before the step of filling said channel.

6. The method according to claim 1, further comprising the step of moving said head relative to said first metal material and said second metal material such that said laser device cuts said first metal material and said second metal material before said at least one of said GMAW welding and said MIG brazing device welds said first and second metal materials.

7. The method according to claim 1, wherein said second metal material is cut completely therethrough during the step of cutting with said laser device.

8. The method according to claim 1, wherein said first metal material and said second metal material is steel.

* * * * *